United States Patent
Sasaki

(10) Patent No.: US 9,631,830 B2
(45) Date of Patent: Apr. 25, 2017

(54) MOTOR CONTROL DEVICE, MOTOR CONTROL METHOD, AND BLOWER APPARATUS

(71) Applicant: Panasonic Intellectual Property Management Co., Ltd., Osaka-shi, Osaka (JP)

(72) Inventor: Ryuta Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 268 days.

(21) Appl. No.: 14/420,306

(22) PCT Filed: May 10, 2013

(86) PCT No.: PCT/JP2013/003017
§ 371 (c)(1),
(2) Date: Feb. 6, 2015

(87) PCT Pub. No.: WO2014/024359
PCT Pub. Date: Feb. 13, 2014

(65) Prior Publication Data
US 2015/0226444 A1  Aug. 13, 2015

(30) Foreign Application Priority Data
Aug. 9, 2012  (JP) .................. 2012-177146

(51) Int. Cl.
*H02P 6/08* (2016.01)
*F24F 11/00* (2006.01)
(Continued)

(52) U.S. Cl.
CPC ........ *F24F 11/006* (2013.01); *F24F 11/0079* (2013.01); *G05B 15/02* (2013.01);
(Continued)

(58) Field of Classification Search
CPC ........................................................ H02P 6/08
(Continued)

(56) References Cited

U.S. PATENT DOCUMENTS

| 5,469,816 A * | 11/1995 | Murakawa ............. B60K 6/485 123/2 |
| 2010/0101265 A1 | 4/2010 | Yokouchi et al. |
| 2011/0223463 A1 | 9/2011 | Katono et al. |

FOREIGN PATENT DOCUMENTS

| JP | 8-140390 A | 5/1996 |
| JP | 2003-143887 A | 5/2003 |

(Continued)

OTHER PUBLICATIONS

Office Action and English language translation of Search Report, in corresponding Chinese Application No. 201380041228.9, dated Aug. 1, 2016, 9 pages.

(Continued)

*Primary Examiner* — David S Luo
(74) *Attorney, Agent, or Firm* — Brinks Giilson & Lione

(57) ABSTRACT

A motor control device which controls a motor for driving a blower unit, comprises a torque command generating section which obtains a motor speed of the motor and generates a torque command which causes an air flow of air supplied from the blower unit to coincide with a target air flow; wherein the torque command generating section is configured to calculate the torque command as a product of a polynomial of variables derived by dividing the target air flow by the motor speed, and a square of the motor speed.

8 Claims, 8 Drawing Sheets

(51) Int. Cl.
    *G05B 15/02*    (2006.01)
    *G05D 7/06*     (2006.01)
    *H02P 23/00*    (2016.01)

(52) U.S. Cl.
    CPC ............ *G05D 7/0629* (2013.01); *H02P 6/08* (2013.01); *H02P 23/0004* (2013.01); *Y02B 30/746* (2013.01)

(58) Field of Classification Search
    USPC .............................................. 318/3, 34, 558
    See application file for complete search history.

(56) References Cited

FOREIGN PATENT DOCUMENTS

| JP | 2006-214601 A | 8/2006 |
| WO | WO 2008/117515 A1 | 10/2008 |

OTHER PUBLICATIONS

International Search Report in corresponding International Application No. PCT/JP2013/003017, dated Jul. 2, 2013, 2 pages.

\* cited by examiner

MOTOR CONTROL DEVICE, MOTOR CONTROL METHOD, AND BLOWER APPARATUS

This application is a 371 application of PCT/JP2013/003017 having an international filing date of May 10, 2013, which claims priority to JP2012-177146 filed Aug. 9, 2012, the entire contents of which are incorporated herein by reference.

TECHNICAL FIELD

The present invention relates to a motor control device, a motor control method, and a blower apparatus. Particularly, the present invention relates to an air flow (air volume) control method of a blower unit in an air conditioning system which performs ventilation or cooling and heating.

BACKGROUND ART

In an air conditioning system which performs ventilation or cooling and heating, especially in an air conditioning system which supplies air from one blower unit to one or a plurality of rooms via duct(s), a condition (hereinafter will be referred to as "pressure loss condition") which determines a pressure loss in the air conditioning system, is different, depending on the installed state or use state of an air conditioning apparatus including the blower unit. For example, the pressure loss condition is different depending on a difference in the shape or length of the duct(s) connected to the air conditioning apparatus. Also, due to clogging of a filter attached to the outlet port or suction port of the air conditioning apparatus, the pressure loss condition changes with a passage of time. Due to the difference or change in the pressure loss condition with a passage of time, a static pressure required to obtain a specified air flow also changes. For this reason, even when a plurality of air conditioning apparatus of the same specification are driven at equal torque or an equal rotational speed, the resulting air flows (air volumes) may be sometimes non-uniform. Or, even when a particular air conditioning apparatus is driven at constant torque or a constant rotational speed, its air flow cannot be maintained at a constant value. Under the circumstances, in recent years, it is required that the air flow be controlled to be maintained at a target air flow, when the pressure loss condition or the static pressure changes.

As a technique for realizing the constant air flow control, for example, there is a method which uses a pressure sensor. However, this method has a problem that the pressure sensor is not easily installed or a reliability is low in long-time use. To solve this, study has been conducted for various methods which utilize a characteristic (hereinafter will be referred to as "blower characteristic") unique to the blower unit, which is necessary for the constant air flow control without using the pressure sensor. In this method, prior to operation (running) under the constant air flow control, a measurement experiment which measures the relation between the physical amounts (motor speed, motor torque, etc.) of a motor of the blower unit, and the air flow, is conducted preliminarily. By utilizing the blower characteristics obtained in this measurement experiment, the constant air flow control is performed.

As such a technique of the constant air flow control, for example, Patent Literature 1 is known. According to the prior art disclosed in Patent Literature 1, the command speed of the motor which drives the blower unit is calculated according to the following formula (1):

$$S^* = S + K \times (S - Sa) \quad (1)$$

S* indicates the command speed of the motor, S indicates a motor speed, Sa indicates a target motor speed, and K indicates a gain. The target motor speed Sa is calculated from the following formula (2):

$$Sa = \sum_{n=0}^{j}\left(\sum_{m=0}^{i}(k_{nm}T^n Q^{*m})\right) \quad (2)$$

T indicates motor torque, Q* indicates a target air flow, $k_{nm}$ (n=0, 1, 2, ..., j, m=0, 1, 2, ..., i) indicates a constant, i indicates a finite value, and j indicates a finite value. The formula (2) represents a relation in which the motor speed required to allow the air flow to become the target air flow Q* in a case where the motor torque is T is Sa.

The constant $k_{nm}$ is a coefficient unique to the blower unit, and is derived by conducting the measurement experiment preliminarily. In this measurement experiment, initially, the blower unit is connected to wind tunnel experiment equipment, and the motor torque and the air flow are measured while changing the motor speed under different static pressures. Then, the value of the constant $k_{nm}$ is calculated using a least square method so that the formula (2) becomes a regression formula which satisfies this measurement data on average.

The motor control device disclosed in Patent Literature 1 implements the constant air flow control by performing the speed control in such a manner that the command speed S* is calculated according to the formula (2) to which the constant $k_{nm}$ derived preliminarily by the measurement experiment is applied and the formula (1), and the motor speed S tracks the command speed S*, in the manner as described above.

CITATION LIST

Patent Literature

Patent Literature 1: International Publication No. 2008/117515

SUMMARY OF INVENTION

Technical Problem

In the prior art disclosed in Patent Literature 1, the accuracy degree to which the air flow coincides with the target air flow during the constant air flow control depends on the accuracy degree to which the formula (2) can regress the actual blower characteristic of the blower unit. In brief, the accuracy degree to which the air flow coincides with the target air flow depends on the accuracy degree of the constant $k_{nm}$. If the constant $k_{nm}$ containing an error is applied to the formula (2), the motor is controlled based on incorrect blower characteristic. This results in an air flow error. As a result, a desired target air flow cannot be obtained.

The accuracy degree of the constant $k_{nm}$ is significantly affected by the regression error in the case where the formula (2) which is the regression formula is derived from the obtained measurement data. To lessen the regression error, it becomes necessary to conduct the measurement experiment while ensuring adequate measurement data in number and an adequate measurement range. This is because if the measurement data is less in number, the blower characteristic between the measurement data and the measurement data cannot be regressed accurately, while if the measurement range is not adequate, the blower characteristic outside the measurement range cannot be regressed accurately.

In the prior art disclosed in Patent Literature 1, to ensure an adequate measurement range, it is necessary to change both of the static pressure and the motor speed over an entire actual use range. In other words, it is necessary to perform the measurement while changing the static pressure in the wind tunnel experiment equipment over the entire changing magnitude of the static pressure which is assumed during the operation under the constant air flow control and changing the motor speed over an entire motor speed range used during the operation under the constant air flow control. Thus, it is necessary to calculate much data, and as a result, many experiment steps are required.

The present invention is directed to solving the above described problem associated with the prior art, and an object of the present invention is to provide a motor control device, a motor control method, and a blower apparatus, which are capable of performing the constant air flow control, with fewer experiment steps, and irrespective of a change in the pressure loss condition or a change in the static pressure.

Solution to Problem

To solve the above described object, according to an aspect of the present invention, there is provided a motor control device which controls a motor for driving a blower unit, comprising: a torque command generating section which obtains a motor speed of the motor and generates a torque command which causes an air flow of air supplied from the blower unit to coincide with a target air flow; wherein the torque command generating section is configured to calculate the torque command as a product of a polynomial of variables derived by dividing the target air flow by the motor speed, and a square of the motor speed.

In accordance with this configuration, since the motor can be controlled while automatically searching the motor output which can attain the target air flow, the constant air flow control can be performed accurately even when the pressure loss condition and the static pressure change. In addition, since the torque command is derived as a product of a polynomial of variables derived by dividing the target air flow by the motor speed, and the square of the motor speed, it becomes possible to implement the constant air flow control with a high accuracy, with fewer experiment steps, and irrespective of the change in the pressure loss condition or the change in the static pressure.

According to another aspect of the present invention, there is provided method of controlling a motor for driving a blower unit, the method comprising: a first step of obtaining a motor speed of the motor and generating a torque command which causes an air flow of air supplied from the blower unit to coincide with a target air flow; wherein in the first step, the torque command is calculated as a product of a polynomial of variables derived by dividing the target air flow by the motor speed, and a square of the motor speed.

According to another aspect of the present invention, there is provided a blower apparatus including a blower unit; a motor which drives the blower unit; and a motor control device which controls driving of the motor, the motor control device comprising the above described configuration.

The above and further objects, features and advantages of the invention will more fully be apparent from the following detailed description with reference to the accompanying drawings.

Advantageous Effects of Invention

The present invention is configured as described above, and has an advantage that it becomes possible to implement constant air flow control with a high accuracy, with fewer experiment steps, and irrespective of a change in a pressure loss condition or a change in a static pressure.

DETAILED DESCRIPTION OF THE PREFERRED EMBODIMENTS

Outline of the Present Invention

Figure 1:
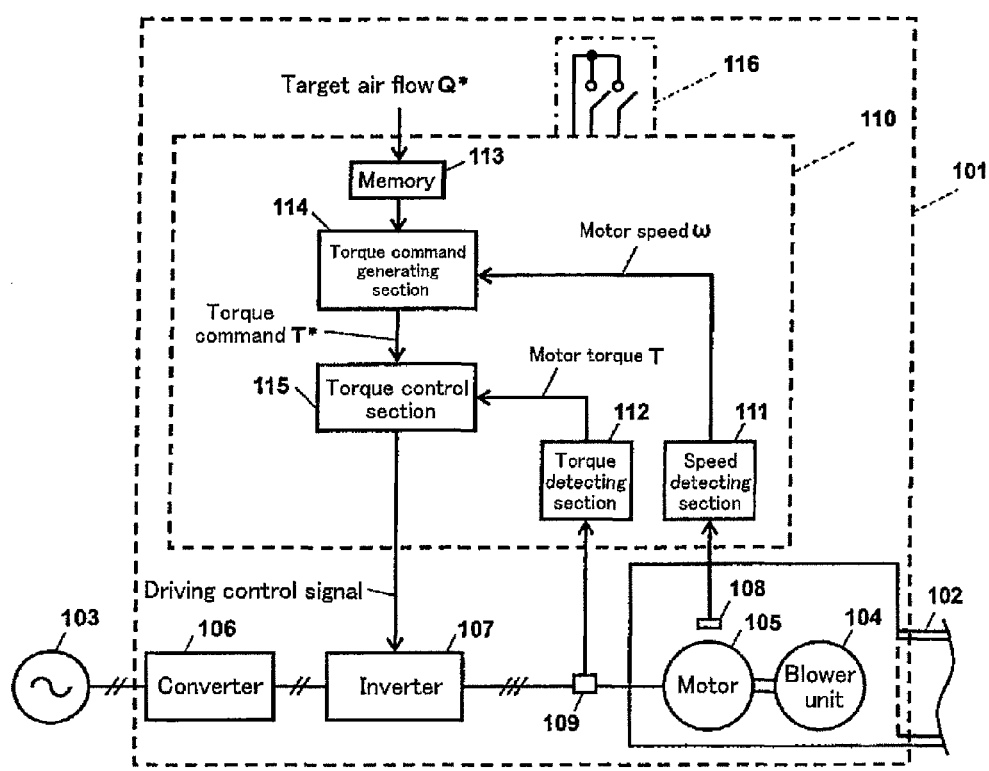
FIG. 1 is a block diagram showing an air conditioning apparatus to which a motor control device according to an embodiment of the present invention is applied.

Initially, the outline of the present invention will be described. As described above, in the method of performing the constant air flow control, the measurement experiment for deriving the blower characteristic (relation between physical amounts of motor and air flow) which is unique to the blower unit, which is necessary for the constant air flow control, is conducted preliminarily for each blower unit, in the conventional motor control device. In the measurement experiment, in the conventional configuration, the measurement experiment is conducted according to the above stated formula (2), and therefore, the relation between the physical amounts of motor and the air flow is not unique. For this reason, in the measurement experiment, it is necessary to change both of the static pressure relating to the air flow and the motor speed which is the physical amount of the motor, over the entire actual use range. In other words, it is necessary to change the static pressure in the wind tunnel experiment equipment over the entire changing magnitude of the static pressure which is assumed during the operation under the constant air flow control and to change the motor speed over an entire motor speed range used during the operation under the constant air flow control. Thus, many experiment steps are required, and the coefficients obtained from the measurement experiment are approximate values. As a result, it is difficult to improve the accuracy.

In view of the above stated problem, the inventors of the present invention studied intensively. As a result, the inventors attained the finding that the relation between the physical amounts of the motor and the air flow can be made unique by applying the concept of similarity of flows to the motor control device. Specifically, by utilizing the fact that in the similarity of flows, the motor output is proportional to the cubic of the motor speed, the air flow is proportional to the motor speed, and the motor output is a product of the motor torque and the motor speed, and thereby the motor torque is proportional to a square of the motor speed, the constant air flow control is performed by using a torque command calculated as a product of a polynomial of variables derived by dividing a target air flow by the motor speed, and the square of the motor speed. By using the formula in which the relation between the motor speed and the motor torque, and the air flow, is unique, in this way, the values of the blower coefficients which are applicable to every motor speed can be derived once the data measurement is performed using one motor speed. This makes it possible to implement the constant air flow control with a high accuracy, with fewer experiment steps, and irrespective of the change in the pressure loss condition or the change in the static pressure.

Now, the formulas used to derive the torque command utilized in the embodiment of the present invention will be described.

It is assumed that a particular blower unit is driven at one motor speed $\omega_s$ by a particular motor and the static pressure in an environment in which the blower unit is installed is changed while maintaining this motor speed $\omega_s$. It is also assumed that the relation between the motor torque $T_s$ and the air flow $Q_s$ at this time is regressed to the following polynomial (3):

$$T_S = \sum_{n=0}^{i} (K_n \cdot Q_S^n) \quad (3)$$

i indicates a finite value of integer which is equal to or larger than 0 and indicates the order of the regression formula, and $K_n$ is a constant (n=0, 1, 2, . . . , i) indicating the coefficient.

In general, in the blower unit such as a fan and a blower, because of the similarity of flows, shaft power is proportional to the cube of the rotational speed of the blower unit, and the air flow is proportional to the rotational speed of the blower unit. This rule applies to general fluidic machines which are other than the blower unit. If the blower unit and the shaft of the motor are joined together without a deflection or detachment, it can be supposed that the shaft power of the blower unit is equal to the motor output and the rotational speed of the blower unit is equal to that of the motor speed. Therefore, the motor output is proportional to the cube of the motor speed, and the air flow is proportional to the motor speed. By utilizing the fact that the motor output is a product of the motor torque and the motor speed, the relation in which the motor torque for driving the blower unit is proportional to the square of the motor speed can be derived. Therefore, because of the similarity of flows, the following formulas (4) and (5) are satisfied:

$$\frac{T}{T_S} = \left(\frac{\omega}{\omega_S}\right)^2 \quad (4)$$

$$\frac{Q}{Q_S} = \frac{\omega}{\omega_S} \quad (5)$$

The formula (4) and the formula (5) represent the relation in which when the motor speed of the motor for driving the blower unit is changed from $\omega_S$ into $\omega$, the motor torque is changed from $T_S$ into T with a ratio of the square of the change rate ($\omega/\omega_S$) of the motor speed, and the air flow is changed at the same time, from $Q_S$ into Q with a ratio that is equal to the change rate ($\omega/\omega_S$) of the motor speed. By applying the formula (4) and the formula (5) to the formula (3), the following formula (6) is derived:

$$T = \sum_{n=0}^{i} \left[K_n \cdot \left(\frac{\omega}{\omega_S}\right)^{2-n} \cdot Q^n\right] \quad (6)$$

T indicates the motor torque, $\omega$ indicates the motor speed, Q indicates the air flow, and i indicates a finite value of integer which is equal to or larger than 0 and has an order which is equal to that of the formula (3), $K_n$ indicates a constant (n=0, 1, 2, . . . , i) which is equal to the coefficient of the formula (3), and $\omega_S$ indicates a particular motor speed used for deriving the formula (6).

The above formula (6) indicates the relation in which the motor torque in a case where the air flow is Q with respect to an arbitrary motor speed $\omega$, is T. When the air flow Q is replaced by a target air flow Q*, the motor torque T is replaced by a torque command T*, and the constant $K_n$ and the constant $\omega_S$ are replaced by $\alpha_n$ and $\beta$, respectively, the following formula (7) is derived:

$$T^* = \sum_{n=0}^{i} \left[\alpha_n \cdot \left(\frac{\omega}{\beta}\right)^{2-n} \cdot Q^{*n}\right] \quad (7)$$

$\omega$ indicates the motor speed, Q* indicates the target air flow, i indicates a finite value of integer which is equal to or larger than 0, and $\alpha_n$ (n=0, 1, 2, . . . , i) and $\beta$ indicate constants, respectively.

In the above formula (7), the polynomial of variables derived by dividing the target air flow Q* by the motor speed $\omega$, corresponds to $(\alpha_n/\beta^{2-n})(\omega^*/Q^*)^n$. When this polynomial is multiplied by $\omega^2$ which is the square of the motor speed $\omega$, the formula (7) is derived.

As described above, by measuring the motor torque and the air flow while driving the blower unit at one motor speed $\omega_S$, and regressing the measurement result to the formula (3), the values of the blower coefficients $\alpha_n$ and $\beta$ can be decided immediately from $\omega_S$ and $K_n$.

As should be understood from the above, according to an aspect of the present invention, there is provided a motor control device which controls a motor for driving a blower unit, comprising: a torque command generating section which obtains a motor speed of the motor and generates a torque command which causes an air flow of air supplied from the blower unit to coincide with a target air flow;

wherein the torque command generating section is configured to calculate the torque command as a product of a polynomial of variables derived by dividing the target air flow by the motor speed, and a square of the motor speed.

The torque command generating section may calculate the torque command according to the above formula (7).

The motor control device may include a storage section for storing predetermined minimum motor torque and predetermined maximum motor torque which is larger than the minimum motor torque, wherein the torque command generating section may limit the torque command to a value within a range between the minimum motor torque and the maximum motor torque.

The torque command generating section may output the torque command which is equal in value to the torque command previously output, in at least one of a case where a difference between the torque command and the motor torque falls within a first predetermined range, and a case where a difference between the motor torque currently obtained and the motor torque previously obtained falls within a second predetermined range.

The motor control device may include a torque control section which obtains the motor torque of the motor and generates a signal for controlling a driving voltage supplied to the motor such that the motor torque coincides with the torque command.

The motor control device may include a first detecting section for detecting the motor speed.

The motor control device may include a second detecting section for detecting motor torque of the motor or a current flowing through the motor.

The motor control device may include a memory for storing the target air flow.

The memory may store a plurality of air flow values and the torque command generating section may select one of the plurality of air flow values, as the target air flow.

The motor control device may include a switch which is operated manually, and may be configured to select one of the plurality of air flow values as the target air flow, by operation of the switch.

The motor control device may further include a communication section which receives a select signal used to select the target air flow from the plurality of air flow values.

The motor control device may further include a communication section which receives a signal indicating the target air flow.

The motor control device may include a first unit including at least the torque command generating section, and a second unit including at least the torque control section, and the first unit and the second unit may perform data communication between them.

The first unit may transmit at least the torque command to the second unit by the data communication, and the second unit may transmit to the first unit a detection signal including information of the motor torque by the data communication.

According to another aspect of the present invention, there is provided a method of controlling a motor for driving a blower unit, the method comprising: a first step of obtaining a motor speed of the motor and generating a torque command which causes an air flow of air supplied from the blower unit to coincide with a target air flow; wherein in the first step, the torque command is calculated as a product of a polynomial of variables derived by dividing the target air flow by the motor speed, and a square of the motor speed.

In the first step, the torque command may be calculated according to the above formula (7).

The method of controlling the motor may comprise storing predetermined minimum motor torque and predetermined maximum motor torque which is larger than the minimum motor torque, wherein in the first step, the torque command may be limited to a value within a range between the minimum motor torque and the maximum motor torque.

The method of controlling the motor may include a second step of setting the torque command to a value which is equal to the value of the torque command previously output, in at least one of a case where a difference between the torque command and the motor torque falls within a first predetermined range, and a case where a difference between the motor torque currently obtained and the motor torque previously obtained falls within a second predetermined range.

The method of controlling the motor may include a third step of obtaining the motor torque of the motor and generating a signal for controlling a driving voltage supplied to the motor such that the motor torque coincides with the torque command.

The method of controlling the motor may include measuring the motor torque of the motor and the air flow while driving the blower unit at one motor speed by the motor; deriving a coefficient of the polynomial by regressing or approximating the motor torque to the polynomial relating to the air flow; calculating a value of a constant $\alpha_n$ such that the coefficient of the polynomial becomes a factor of the constant $\alpha_n$, and deciding the one motor speed used in measurement of the motor torque and the air flow as a value of the constant $\beta$.

In the method of controlling the motor, the coefficient of the polynomial obtained by regressing or approximating the motor torque to the polynomial relating to the air flow may be decided as the value of the constant $\alpha_n$.

In the method of controlling the motor, a value obtained by multiplying by an integer power of a change rate of a dimension of the blower unit, the coefficient of the polynomial obtained by regressing or approximating the motor torque to the polynomial relating to the air flow may be decided as the value of the constant $\alpha_n$.

According to another aspect of the present invention, there is provided a blower apparatus including a blower unit; a motor which drives the blower unit; and a motor control device which controls driving of the motor, the motor control device comprising: a torque command generating section which obtains a motor speed of the motor and generates based on the target air flow and the motor speed, a torque command which causes an air flow of air supplied from the blower unit to coincide with a target air flow; and a torque control section which obtains the motor torque of the motor and generates a signal for controlling a driving voltage supplied to the motor to cause the motor torque to coincide with the torque command; wherein the torque command generating section is configured to calculate the torque command as a product of a polynomial of variables derived by dividing the target air flow by the motor speed, and a square of the motor speed.

The blower apparatus may be mounted in an air conditioning apparatus.

The air conditioning apparatus may be incorporated into one of a general home, a construction for business purpose, a construction for commercial use, a clean room, and air conditioning equipment for business purpose.

The air conditioning apparatus may be incorporated into one of a car, a bus, a railway vehicle, an aircraft, and a marine vessel.

Hereinafter, a motor control device and a motor control method according to the embodiment of the present invention will be described with reference to the drawings. The constant air flow control performed by the motor control device of the present embodiment is intended to maintain an air flow at a target air flow, irrespective of a change in a pressure loss condition or a change in a static pressure. Regarding an example of calculation of blower coefficients of the present embodiment, a description will be given of a measurement experiment conducted to attain the blower coefficients which are unique to the blower unit which is required to realize such a constant air flow control and calculation based on the measurement experiment. The measurement experiment and the calculation based on the measurement experiment are performed prior to the constant air flow control. The present invention is not limited by the embodiment.

Embodiment

FIG. 1 is a block diagram showing an air conditioning apparatus to which a motor control device according to the embodiment of the present invention is applied. As shown in FIG. 1, an air conditioning apparatus 101 configured as a blower apparatus of the present embodiment includes a blower unit 104 which sends air to an air flow passage 102, a motor 105 which drives the blower unit 104, a converter 106 which converts AC power supplied from an AC power supply 103 into DC power, an inverter 107 which converts the DC power into the AC power and supplies the AC power to the motor 105, a position detector 108 which detects the position of a rotor (not shown) of the motor 105, a current detector 109 which detects the current of the motor 105, and a motor control device 110 which controls the air flow of the air conditioning apparatus 101 such that the air flow coincides with a target air flow Q*.

The motor control device 110 includes a speed detecting section 111 which detects a motor speed w from the signal output from the position detector 108, a torque detecting section 112 which detects motor torque T from the signal output from the current detector 109, a memory 113 which stores the target air flow Q* externally input, a torque command generating section 114 which generates a torque command T* based on the motor speed w and the target air flow Q* read from the memory 113, a torque control section 115 which outputs a driving control signal to the inverter to cause the motor torque T to track the torque command T*, and a switch 116. In the present embodiment, the speed detecting section 111 serves a first detecting section which detects the motor speed as a first change amount, while the torque detecting section 112 serves as a second detecting section which detects as a second change amount the motor torque or a current flowing through the motor 105.

Next, the operation and components of the air conditioning apparatus 101 of FIG. 1 will be described in detail. The blower unit 104 supplies air to a desired location through the air flow passage 102. In the present embodiment, the blower unit 104 is a multi-blade fan. Note that the structure or type of the blower unit 104 is not particularly limited, and need not be the multi-blade fan. The motor 105 rotates in a state in which it is joined to the blower unit 104, to drive the blower unit 104. In the present embodiment, the motor 105 is a permanent magnet synchronous motor. Note that the structure or type of the motor 105 is not particularly limited, but may be other motor, for example, an induction motor or an electromagnetic synchronous motor. The converter 106 rectifies and smoothes the AC voltage of the AC power supply 103 and converts the AC voltage into a specified DC voltage. The inverter 107 performs semiconductor switching in accordance with the driving control signal received from the motor control device 110, converts the DC voltage from the converter 106 into the AC voltage and supplies the AC voltage to the motor 105 as a driving voltage. A switching configuration or switching method within the inverter 107 is not particularly limited so long as they are adapted to an aim of driving the motor 105. A position detector 108 is attached to the motor 105, and outputs a signal corresponding to the position of the rotor (not shown) of the motor 105. In a case where the position or speed of the rotor can be detected by estimation, the position detector 108 may be omitted. The current detector 109 directly detects the phase current of the motor and outputs a signal corresponding to a phase current value. The current detector 109 may detect the current in any location so long as the motor torque can be estimated from the detected current. For example, the current detector 109 may be inserted into a DC line from the converter 106 to the inverter 107 and detect the current.

Next, the operation and components of the motor control device 110 will be described.

The speed detecting section 111 calculates the motor speed ω based on the output signal of the position detector 108. The speed detecting section 111 may calculate the motor speed ω using the motor current or the motor driving voltage, instead of using the output signal of the position detector 108, in a case where the motor 105 is driven by sensorless control that detects position and speed of the rotor by estimation. The torque detecting section 112 calculates the motor torque T based on the output signal of the current detector 109. The motor torque T may be a physical amount including torque information of the motor 105, for example, the motor current, or a vector component that contributes to the torque in the motor current. For example, the vector component that contributes to the torque may be q-axis current in a case where the motor current is d-q converted. Although the speed detecting section 111 and the torque detecting section 112 need not be placed within the motor control device 110, in the example of FIG. 1, they may be placed outside the motor control device 110. In a case where the speed detecting section 111 and the torque detecting section 112 are placed outside the motor control device 110, they output the calculated motor speed ω and the calculated motor torque T to the motor control device 110.

The memory 113 is a storage section comprising RAM, ROM, etc. The target air flow Q* is pre-stored in the ROM. The torque command generating section 114 reads the target air flow Q* from the ROM and uses the target air flow Q* in calculation when it performs the calculation as will be described later. A plurality of target air flows Q* may be pre-stored in the memory 113. In this case, one target air flow Q* is selected from the plurality of target air flows Q* in response to a communication input from outside the motor control device 110. Or, one target air flow Q* may be selected from the plurality of target air flows Q* by manual operation of a switch 116 provided in the motor control device 110.

Or, the target air flow Q* may not be necessarily pre-stored in the ROM. The target air flow Q* may be suitably transmitted to the motor control device 110 in response to a communication input from outside the motor control device 110. In this case, the received target air flow Q* is stored in the RAM or the like within the memory 113, and updated every time new target air flow Q* is sent.

The value of the target air flow Q* communicatively input from outside is decided based on an air conditioning environment in which the motor 105 is installed. That is, the target air flow Q* is decided depending on how much air is to be supplied to a room as a reference among rooms to be air-conditioned inside a door, how much air flow is efficient for air-conditioning equipment, etc. In other words, the target air flow Q* may be in some cases compensated depending on a climate or the like of an area in which the air conditioning equipment is installed. For example, in an area which is warm and humid, the target air flow Q* may be set to a relatively large value. In a case where the air conditioning environment is known in advance, the target air flow Q* may be set before the motor is installed. As a matter of course, the target air flow Q* may be set in view of the air conditioning environment in the installation of the motor.

The torque command generating section 114 calculates the torque command T* based on the motor speed ω obtained from the speed detecting section 111 and the target air flow Q* read from the memory 113, and outputs the torque command T* to the torque control section 115. Specifically, the torque command generating section 114 calculates the torque command T* as a product a polynomial of variables obtained by dividing the target air flow Q* by the motor speed ω and a square of the motor speed ω.

In the present embodiment, especially, the torque command generating section 114 calculates the torque command T* according to the formula (7).

The above formula (7) indicates the relation in which the motor torque in a case where the air flow is the target air flow Q* with respect to an arbitrary motor speed ω, is T*. The coefficients $\alpha_n, \beta$ which feature this relation have values which are unique to the shape and dimension of the blower unit. Hereinafter, the coefficients $\alpha_n, \beta$ will be referred to as the blower coefficients. The values of the blower coefficients $\alpha_n, \beta$ are found by performing the measurement experiment and the calculation prior to the operation (running) under the constant air flow control. The measurement experiment and the calculation based on the measurement experiment will be described later.

The torque control section 115 outputs the driving control signal to the inverter 107 to cause the motor torque T to track the torque command T* based on a result of comparison between the motor torque T obtained from the torque detecting section 112 and the torque command T* obtained from the torque command generating section 114, to control the torque of the motor 105.

The switch 116 is provided in the motor control device 110 and is manually operated to be able to select one target air flow Q* from the plurality of target air flows Q* stored in the memory 113. In addition, the switch 116 is manually operated to be able to perform switching of control block configuration within the motor control device 110.

In the present embodiment, the motor control device 110 is capable of shifting a present mode to a mode selected from among a plurality of modes by using the switch 116 or a communication input from outside. The plurality of modes include at least the constant air flow control mode, and the speed control mode. In the constant air flow control mode, as described above, the driving control signal is output to the inverter 107 to cause the motor torque T to track the torque command T* based on a result of comparison between the motor torque T obtained from the torque detecting section 112 and the torque command T* obtained from the torque command generating section 114, to control the torque of the motor 105. In the speed control mode, the speed control section, as will be described later, generates the driving control signal based on the motor speed ω obtained from the speed detecting section 111 and the motor torque T obtained from the torque detecting section 112.

In the present embodiment, it is supposed that the constant air flow control mode is selected. The speed control mode is utilized in the measurement experiment conducted to find the values of the blower coefficients $\alpha_n, \beta$ of the formula (7) used in the torque command generating section 114. Instead of using the switch 116, the control block configuration may be switched by a communication input from outside.

The operation of the motor control device 110 configured as described above will be described with reference to FIG. 2.

Figure 2:
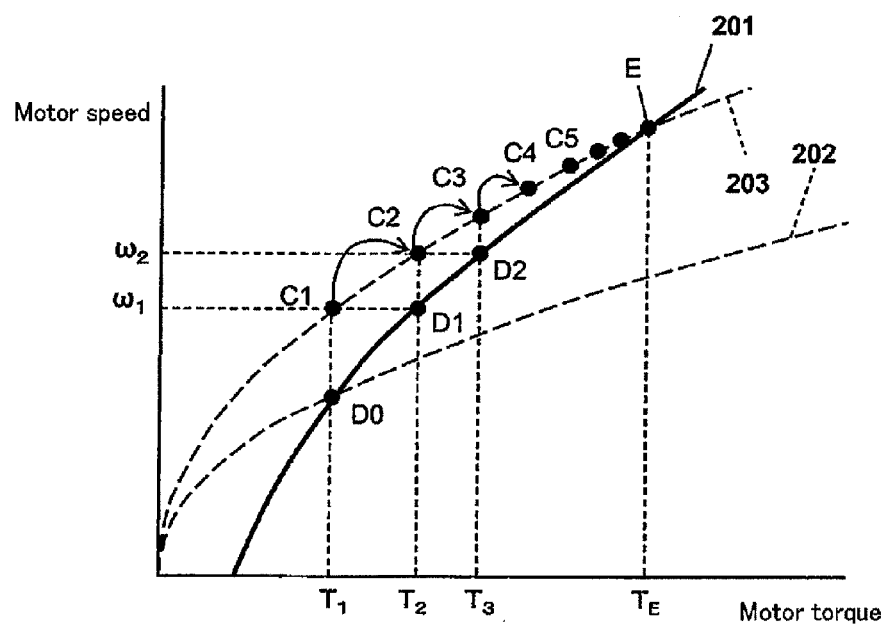
FIG. 2 is a graph showing a motor torque-motor speed characteristic in the motor control device according to the embodiment of the present invention.

FIG. 2 is a graph showing a motor torque-motor speed characteristic in the motor control device according to the embodiment of the present invention. In FIG. 2, a curve 201 (hereinafter will be referred to "constant air flow curve") shows the motor torque-motor speed characteristic in the case where the air flow coincides with the target air flow Q*. A curve 202 and a curve 203 indicate motor torque-motor speed characteristics (hereinafter will be referred to as "pressure loss curves"), respectively, which are unique to the pressure loss condition within the air conditioning system including the air flow passage 102. The motor 105 is able to operate according to the pressure loss curves.

Now, it is supposed that the pressure loss condition of the air conditioning system is indicated by the pressure loss curve 202 and the operation point of the motor 105 lies on a point D0. At this time, the operation point D0 lies on the intersection of the pressure condition curve 202 and the constant air flow curve 201. Therefore, the blower unit 104 supplies the air with an air flow which is equal to the target air flow Q*. At this time, the motor torque is $T_1$.

In this state, it is supposed that the air conditioning environment changes and the pressure loss curve 202 changes into the pressure loss curve 203. For example, it is also supposed that some of vent caps provided at a plurality of outlets of the air flow passage 102 are closed, the number of rooms to be air-conditioned is changed, and thereby the pressure loss in the air conditioning system is increased. At this time, the torque of the motor 105 is controlled by the torque control section 115. Therefore, the operation point shifts to a point C1 on the new pressure loss curve 203 while maintaining the motor torque $T_1$.

After the operation point has shifted to the point C1, the torque command generating section 114 calculates the torque command T* by assigning to the formula (7), the target air flow Q* read from the memory 113 and a present motor speed $\omega_1$ detected by the speed detecting section 111. The torque command T* calculated at this time is motor torque $T_2$ at a point D1 on the constant air flow curve 201 at which the motor speed is the motor speed $\omega_1$ which is the same as that on the present operation point C1. Then, the torque command $T^*=T_2$ is output to the torque control section 115. Then, the torque control section 115 outputs the driving control signal to the inverter 107, based on a difference between the torque command $T^*=T_2$ and the present motor torque $T=T_1$ detected by the torque detecting section 112, thereby controlling the torque of the motor 105.

Now, it is supposed that the operation point shifts from C1 to C2 by the torque control. In the same manner, at the operation point C2, the torque command generating section 114 generates as the torque command T*, motor torque $T_3$ at a point D2 at which the motor speed is the present motor speed $\omega_2$ on the constant air flow curve 201. Then, the torque control section 115 controls the torque based on the torque command $T^*=T_3$. By repeating this, the operation point shifts to C3, C4, C5, . . . , and finally converges at the operation point at which the motor torque T detected by the torque detecting section 112 coincides with the torque command T* generated by the torque command generating section 114 at $T_E$, i.e., an intersection E of the pressure loss curve 203 and the constant air flow curve 201. At this time, the air flow of the air supplied from the blower unit 104 is equal to the target air flow Q*, and thus, the constant air flow control is achieved.

In a case where the pressure condition curve returns from the curve 203 to the curve 202, a procedure which is the reverse of the above procedure occurs. The operation point shifts along the pressure loss curve 202, and returns to an intersection D0 of the pressure loss curve 202 and the constant air flow curve 201.

Next, the operation stability function and protection function of the constant air flow control of the motor control device 110 of the present embodiment will be described.

Figure 3:
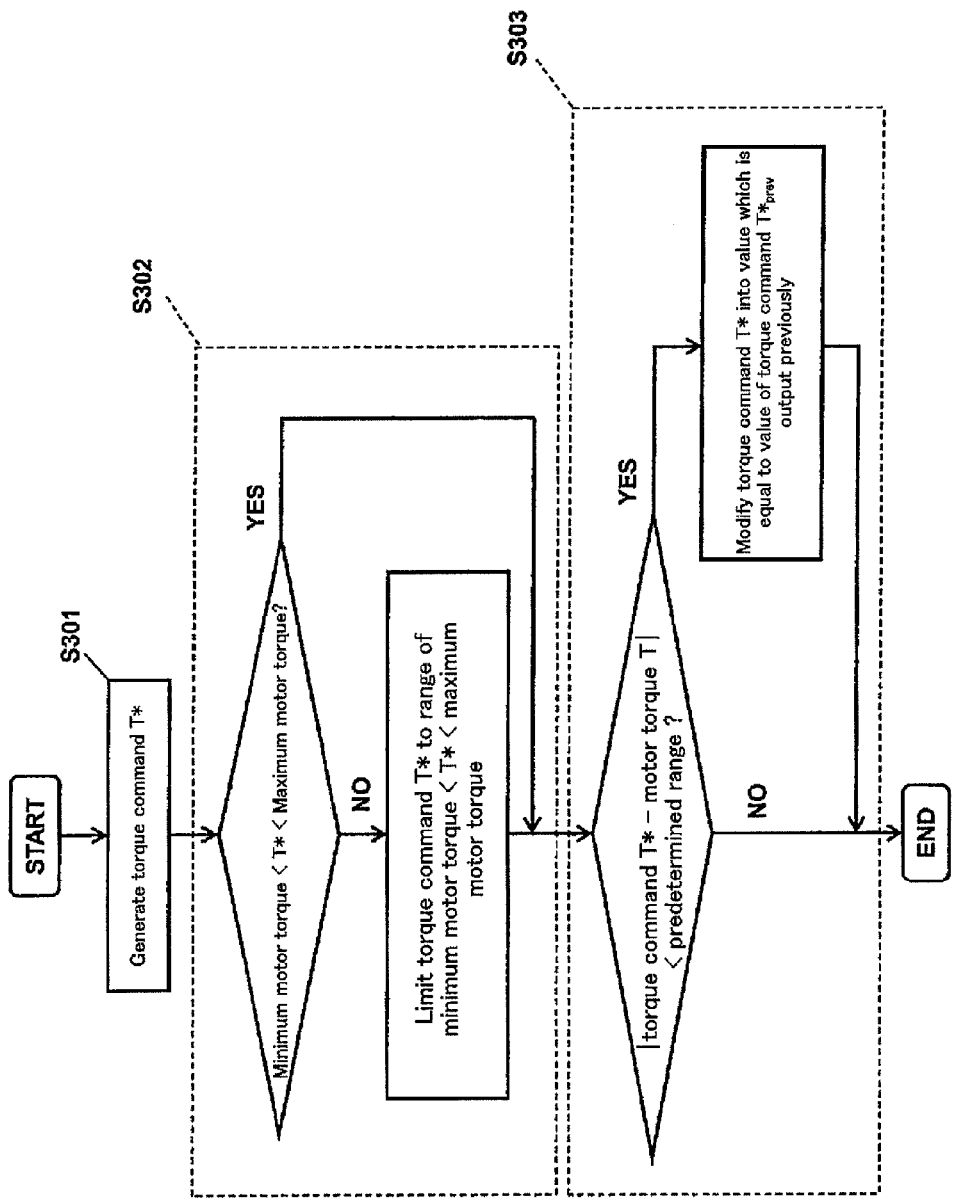
FIG. 3 is a flowchart showing the processing of a torque command generating section in the motor control device according to the embodiment of the present invention.

FIG. 3 is a flowchart showing the processing performed by the torque command generating section 114 in the motor control device according to the embodiment of the present invention. The torque command generating section 114 obtains the motor speed ω detected by the speed detecting section 111 and the target air flow Q* from the memory 114.

In initial step S301, the torque command generating section 114 calculates the torque command T* based on the motor speed ω and the target air flow Q* according to the above stated formula (7). Next in step S302, the torque command generating section 114 determines whether or not the torque command T* calculated in step S301 falls within a range between predetermined minimum motor torque and predetermined maximum motor torque. When the torque command generating section 114 determines that the torque command T* falls within the range, it does not modify the torque command T*. On the other hand, when the torque command generating section 114 determines that the torque command T* is smaller than the predetermined minimum motor torque, it modifies the torque command T* into the predetermined minimum motor torque, while when the torque command generating section 114 determines that the torque command T* is larger than the predetermined maximum motor torque, it modifies the torque command T* into the predetermined maximum motor torque.

The advantages of step S302 will be described. There is an air conditioning environment in which the motor speed ω for attaining the air flow value of the target air flow Q* need not be so high, for example, in a case where the pressure loss in the air flow passage 102 is small. In such an air conditioning environment, the motor speed ω may be very low. In this case, the torque command generating section 114 calculates the torque command T* by assigning a small value to ω of the formula (7). For this reason, due to the limited calculation resolution ability of the motor control device 110, the torque command T* is calculated as substantially zero. When the torque is controlled in accordance with the torque command T* which is substantially zero, the speed of the motor 105 is decreased. If such torque control is repeated, the state in which the torque command T* is zero continues, so that the motor 105 is stopped. To avoid this, the predetermined minimum motor torque which is the lower limit is set in the torque command T*. By controlling the torque such that the torque becomes equal to or larger than the minimum motor torque, stopping of the motor 105 can be prevented.

On the other hand, in a case where the pressure loss in the air flow passage 102 is large, the torque command T* for attaining the air flow value of the target air flow Q* may become a large value. In this case, an attempt is made to implement the operation which is higher than the ability of the motor 105, so that the operation becomes unstable, or a motor current becomes excessively high. If the motor current becomes excessively high and exceeds a rated current value, a failure is likely to occur in the motor 105 due to heat generation of motor windings, or its efficiency is likely to be significantly reduced. If the blower unit 104 is placed in an excess load state due to the ingress of foreign matters, in a state in which the upper limit of the motor torque T is not set, a failure is likely to occur in the air conditioning apparatus 101 including the blower unit 104 and the motor 105, because the motor 105 attempts to increase the torque. To avoid this, the predetermined maximum motor torque which is the upper limit is set in the torque command T*, and the torque is controlled to fall below the predetermined maximum motor torque. In this way, it becomes possible to prevent a situation in which the control becomes unsteady or a failure occurs in the air conditioning apparatus.

Then, in step S303, the torque command generating section 114 calculates a difference between the torque command T* and the motor torque T detected by detected by the torque detecting section 112. When the difference falls outside a predetermined range (first predetermined range), the torque command generating section 114 outputs the torque command T* without modifying it. On the other hand, when the difference falls within the predetermined range, the torque command generating section 114 determines that a change in the motor torque T is slight (less), and modifies the torque command T* into the value which is equal to the value of a torque command $T^*_{prev}$ output previously from the torque command generating section 114. Then, the torque command generating section 114 outputs the modified torque command $T^*_{prev}$ to the torque control section 115.

The advantage of step S303 will be described. If step S303 is not performed and an attempt is made to change the torque command T* in response to a slight change in the motor torque T, the torque command T* will track the slight change in the motor torque T and oscillate.

The air flow of the air supplied from the air conditioning apparatus 101 changes back and forth, while crossing the air flow value of the target air flow Q*. Thus, the air flow does not stably converge. To avoid this, in the present embodiment, a dead zone for detection of the torque is set as the above described range, to prevent the torque command T* from oscillating in a range near a convergence point, thereby allowing the air flow to steadily converge at the target air flow Q*.

In step S303, instead of determining whether or not the difference between the torque command T* and the motor torque T falls within the predetermined range, whether or not to modify the torque command T* may be decided by determining whether or not the difference between the motor torque T obtained currently and the motor torque T obtained previously falls within a second predetermined range.

As described above, the motor control device 110 of the present embodiment includes the torque command generating section 114 which calculates the torque command T* which allows the air flow of the air supplied from the blower unit 104 to coincide with the target air flow Q*, based on the motor speed ω and the target air flow Q*, and the torque control section 115 which outputs the driving control signal to the inverter 107 to cause the motor torque T to coincide with the torque command T*.

In this configuration, even when the pressure loss condition or the static pressure changes, the motor 105 can be controlled while automatically searching the motor torque T which can attain the target air flow Q*. Therefore, the constant air flow control can be performed accurately, irrespective of a change in the pressure loss condition or a change in the static pressure.

Calculation Example 1 of Blower Coefficients

In the constant air flow control according to the above described embodiment, the torque command T* is calculated according to the formula (7). The values of the blower coefficients $\alpha_n, \beta$ in the formula (7) are different depending on the shape and dimension of the blower unit, and are found by preliminarily performing the measurement experiment and calculation prior to the operation under the constant air flow control. Now, the measurement experiment and calculation example, for deriving the values of the blower coefficients $\alpha_n, \beta$ will be described.

Figure 4:
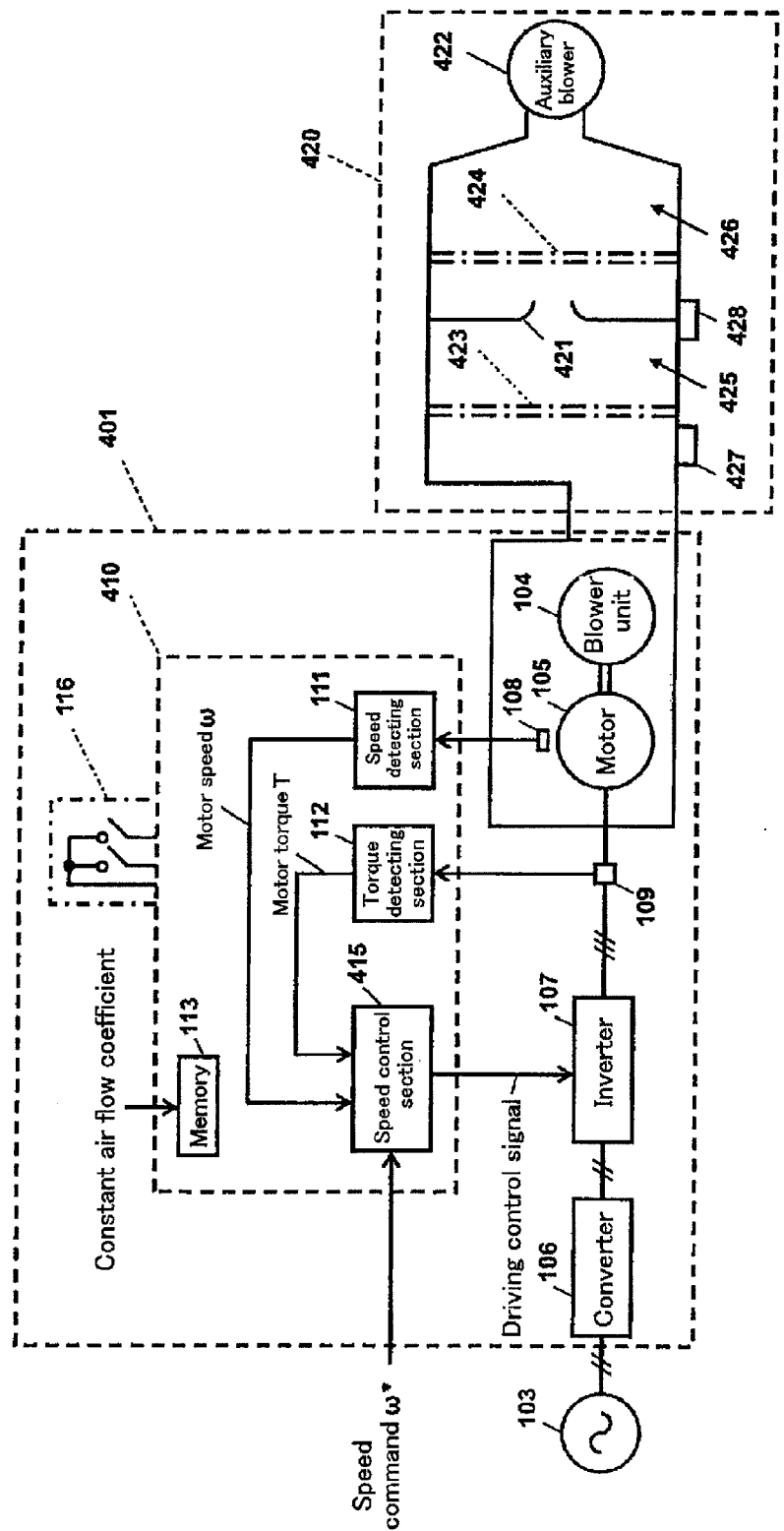
FIG. 4 is a block diagram showing the configuration for calculating blower coefficients in the motor control device according to the embodiment of the present invention.

FIG. 4 is a block diagram showing the configuration for calculating the blower coefficients in the motor control device according to the embodiment of the present invention. FIG. 4 shows the configuration in which the air conditioning apparatus 101 of the embodiment of FIG. 1 is detached from the air flow passage 102 and is connected to wind tunnel experiment equipment 420.

When the blower coefficients are calculated, the motor control device 110 of FIG. 1 is configured as a motor control device 410 operating in the speed control mode. Therefore, in the example of FIG. 4, the motor control device 410 operating in the speed control mode includes the speed detecting section 111, the torque detecting section 112, the memory 113 and a speed control section 415.

The speed control section 415 receives the speed command $\omega^*$ from outside, and outputs to the inverter 107 a driving control signal which causes the motor speed $\omega$ to track the speed command $\omega^*$, thereby controlling the speed of the motor 105.

The memory 113 is a storage section comprising RAM, ROM, etc. The blower coefficient values derived by the measurement experiment and calculation as will be described later can be stored in the memory 113.

The other components of an air conditioning apparatus 401 are the same as those of the above described embodiment of the constant air flow control, and the operation of the same components will not be described repeatedly.

The wind tunnel experiment equipment 420 is an apparatus which reproduces and simulates an actual air conditioning system. The wind tunnel experiment equipment 420 includes a first chamber 425 connected to the blower unit 104, a nozzle 421 attached to the tip end of the first chamber 425, a second chamber 426 connected to the first chamber 425 via the nozzle 421, an auxiliary blower 422 connected to the tip end of the second chamber 426, a static pressure meter 427 which measures a static pressure within the first chamber 423, and an air flow meter 428 which measures the air flow based on a pressure difference between the chambers 425 and 426 which are in front of and behind the nozzle 421, respectively.

The wind tunnel experiment equipment 420 is capable of adjusting the pressure difference between the chambers 425 and 426 which are in front of and behind the nozzle 421, respectively, by opening and closing the nozzle 421 and by adjusting the rotational speed of the auxiliary blower 422. Inside the first chamber 425 and the second chamber 426, rectification grills 423, 424, are provided, respectively, to serve to rectify an air flow. The static pressure meter 427 measures the static pressure based on the pressure difference between the pressure within the first chamber 425 and an atmospheric pressure. The air flow meter 428 measures the air flow based on the pressure difference between the chambers 425 and 426 which are in front of and behind the nozzle 421, respectively. The configuration of the wind tunnel experiment equipment 420 is not limited to the above, but any configuration may be used so long as the static pressure and the air flow can be adjusted and measured.

Figure 5:
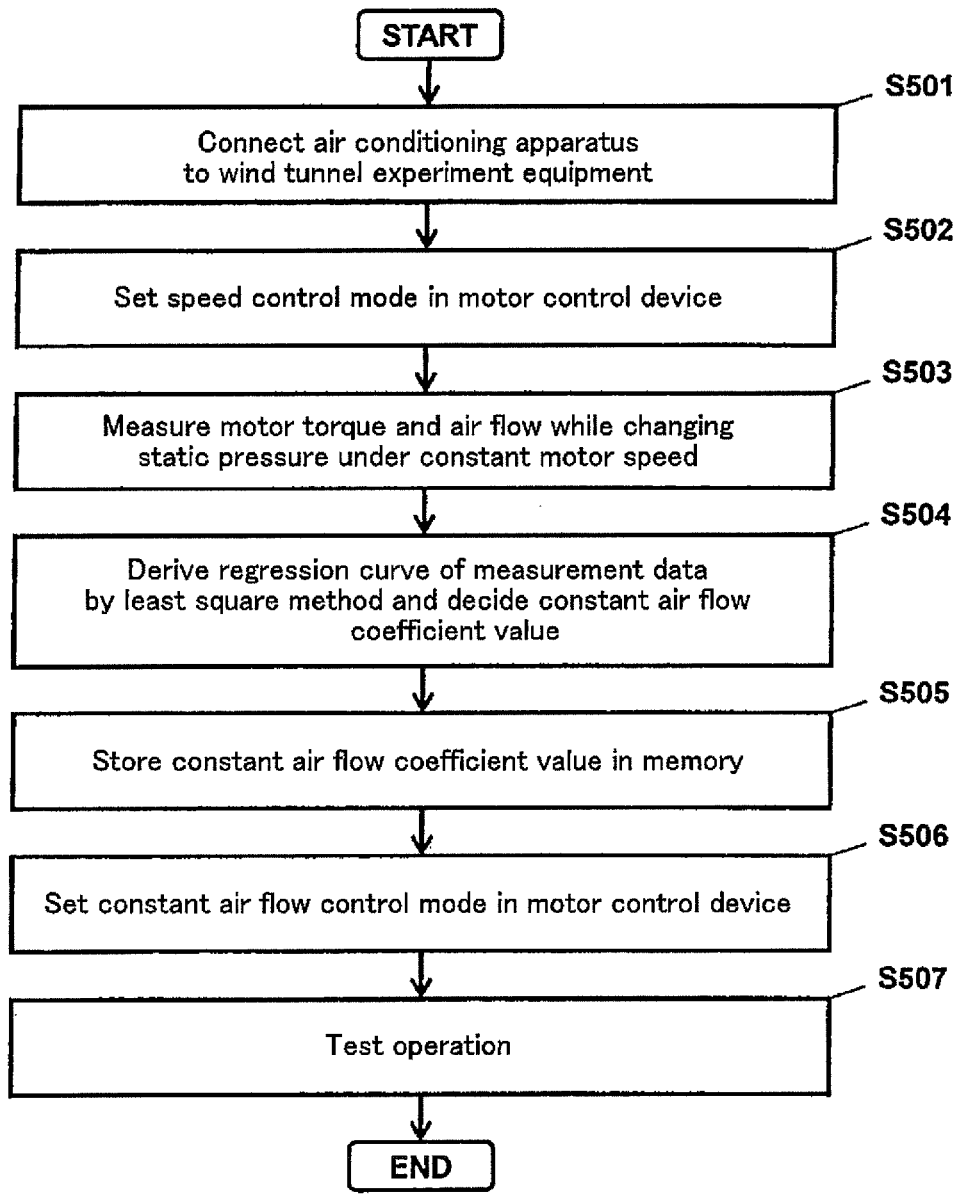
FIG. 5 is a flowchart showing the procedure for calculating the blower coefficients in the motor control device according to the embodiment of the present invention.

FIG. 5 is a flowchart showing the procedure for calculating the blower coefficients in the motor control device according to the embodiment of the present invention.

Initially, in step S501, as shown in FIG. 4, the air conditioning apparatus 401 is connected to the wind tunnel experiment equipment 420.

Then, in step S502, the control block configuration of the motor control device 401 is set to initiate the speed control mode as shown in FIG. 4, by the manual operation of the switch 116 or the communication input.

Then, in step S503, a speed command $\omega^*$ which is set to one speed value is input to the motor control device 410, and the blower unit 104 is controlled at a constant speed using one speed value. Then, different static pressure states are created while keeping the speed at the constant speed, and the air flow and the motor torque are measured. The static pressures are adjusted by opening and closing the nozzle 421 and by adjusting the rotational speed of the auxiliary blower 422 in the wind tunnel experiment equipment 420. The static pressure meter 427 measures the static pressure. The air flow is measured by compensating using the temperature or the like, the pressure difference between the chambers 425 and 426 which are in front of and behind the nozzle 421, respectively, which is observed by the air flow meter 428. Table 1 illustrated below is an example of the motor speed [min$^{-1}$] used in this measurement experiment, the measured motor torque [N·m], and the air flow [m$^3$/min].

TABLE 1

| Motor speed | | Motor torque | Air flow |
|---|---|---|---|
| [min$^{-1}$] | [rad/sec] | [N · m] | [m$^3$/min] |
| 700 | 73.3 | 4.90 | 42.92 |
| 700 | 73.3 | 4.15 | 37.04 |
| 700 | 73.3 | 3.33 | 30.13 |
| 700 | 73.3 | 2.86 | 25.00 |
| 700 | 73.3 | 2.31 | 19.10 |
| 700 | 73.3 | 1.84 | 12.66 |

Then, in step S504, by regressing the measured data to the formula (3), the value of the blower coefficient $\alpha_n$ is decided based on the value of the coefficient $K_n$. In the present embodiment, the order of the regression formula is set to 2. In this case, the regression formula is a second-order polynomial of the following formula (8), which is derived by assigning 2 to i in the formula (3):

$$T_s = K_2 \cdot Q_s^2 + K_1 \cdot Q_s + K_0 \qquad (8)$$

In this formula, $T_s$ indicates the measured motor torque, $Q_s$ indicates the measured air flow, and $K_2, K_1, K_0$ indicate constants representing the coefficients of the regression formula, respectively.

Figure 6:
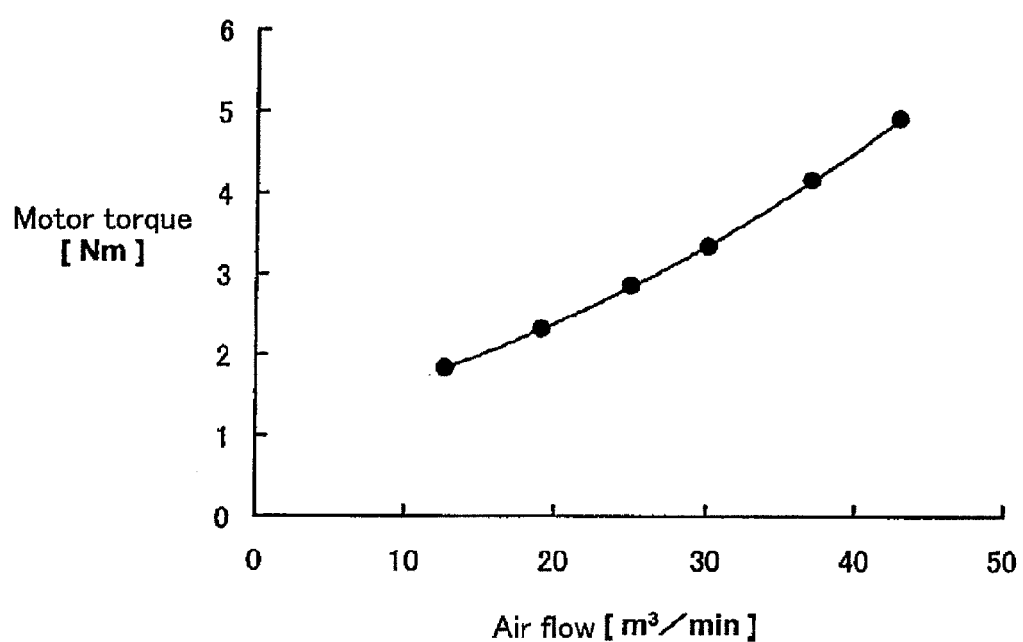
FIG. 6 is a graph showing an air flow-motor torque characteristic formed by plotting measurement data of table 1 and its regression curve.

The values of the coefficients $K_2, K_1, K_0$ are the blower coefficient $\alpha_n$ (n=0, 1, 2). The motor speed used in the measurement in step S503 is the value of the blower coefficient $\beta$. Table 2 illustrated below show the values of the blower coefficients $\alpha_n$ (n=0, 1, 2) and $\beta$ which are derived by regressing the measurement data of the table 1 to the formula (8) by least square method. FIG. 6 is a graph showing the air flow-motor torque characteristic, which is formed by plotting the measurement data of table 1 and its regression curve.

TABLE 2

Coefficient values derived by assigning data of table 1 to formula (8) by least square method $\alpha_2 = K_2 = 1.14\text{E}{-}03$
$\alpha_1 = K_1 = 3.79\text{E}{-}02$
$\alpha_0 = K_0 = 1.18\text{E}{+}00$
$\beta = 77.3$ (rad/sec)

Then, in step S505, the values of the derived blower coefficients $\alpha_n, \beta$ are stored in the memory 113 via the communication input, or the like.

Figure 7:
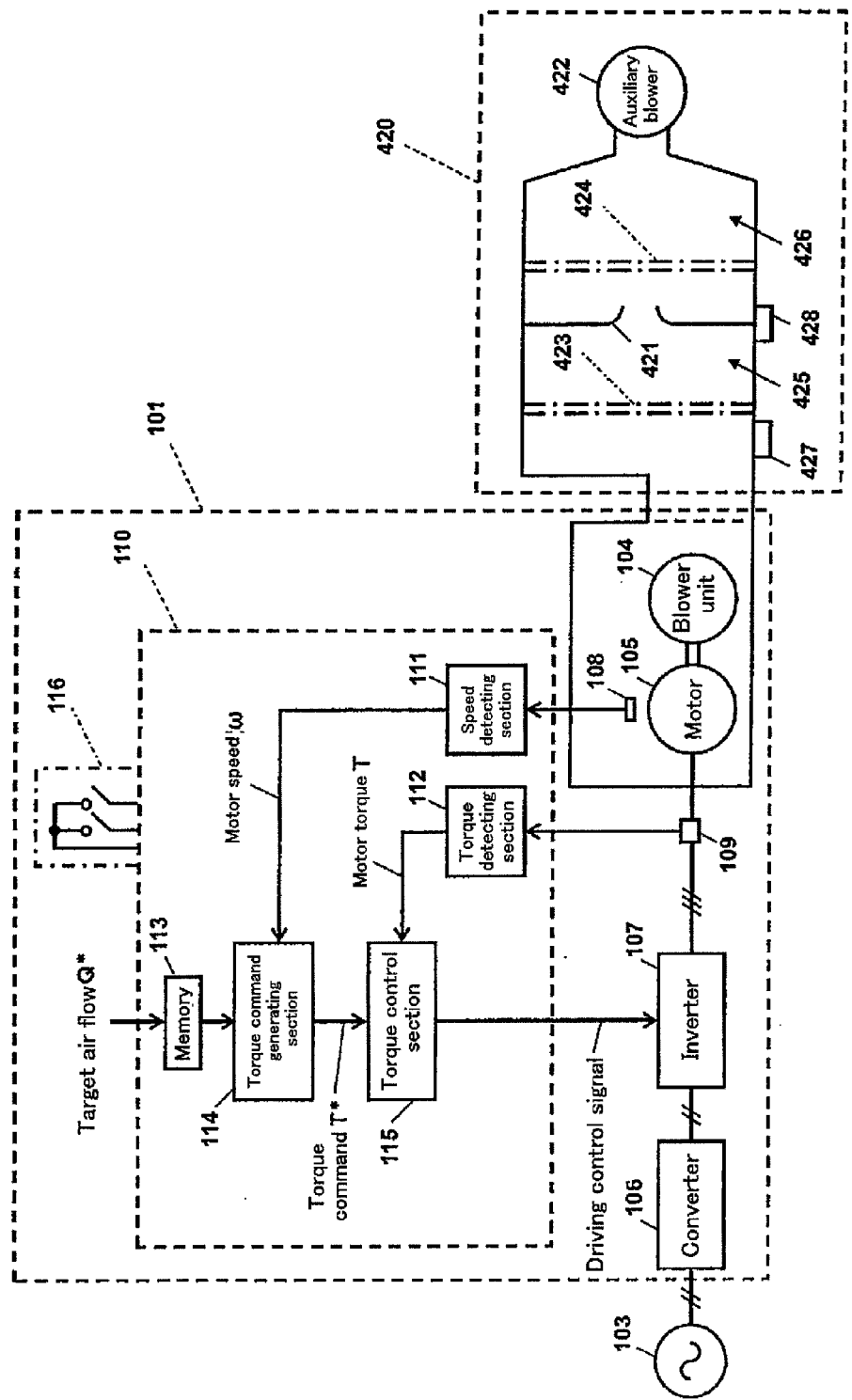
FIG. 7 is a block diagram showing the exemplary configuration for a test operation (running) in a case where the blower coefficients are calculated in the motor control device according to the embodiment of the present invention.

Then, in step S506, the motor control device 410 is shifted from the speed control mode to the constant air flow control mode by the manual operation of the switch 116 or the communication input, and the block configuration for test operation (running) is formed. FIG. 7 is a block diagram showing the exemplary configuration for the test operation (running) in a case where the blower coefficients are calculated in the motor control device according to the embodiment of the present invention. The air conditioning apparatus 101 and the motor control device 110 of FIG. 7 are identical in configuration to those during the constant air flow control of FIG. 1. In other words, the air conditioning apparatus 101 is connected to the wind tunnel experiment equipment 420.

In final step S507, several target air flows Q* are input to the motor control device 110, and the test operation (running) in the constant air flow control mode is performed. Then, it is confirmed whether or not the measured air flow correctly coincides with the target air flow Q*.

During the constant air flow control, the torque command generating section 114 reads the values of the coefficients $\alpha_n, \beta$ from the memory 113, and calculates the torque command T* by using the values of the coefficients $\alpha_n, \beta$. Note that the values of the coefficients $\alpha_n, \beta$ need not be always stored in the ROM, but may be transmitted to the motor control device 110 by the communication input from outside. In this case, the received values of the coefficients $\alpha_n, \beta$ may be stored in the RAM or the like within the memory 113.

As described above, in accordance with the above described calculation procedure, the values of the blower coefficients can be derived by performing data measurement using a single motor speed. Because of this, it is not necessary to perform the measurement while changing the motor speed unlike the prior art disclosed in Patent Literature 1. This makes it possible to implement the constant air flow control with fewer experiment steps.

The calculation formula of the torque command T* is not limited to the formula (7). That is, the same advantages as those of the present embodiment can be attained in the calculation of the blower coefficients, so long as the calculation formula is a calculation formula used to calculate the torque command T* as a product of a polynomial of variables derived by dividing the target air flow Q* by the motor speed $\omega$, and a square of the motor speed $\omega$. For example, the calculation formula of the torque command T* may be the following formula (9):

$$T^* = \omega^2 \cdot \sum_{n=0}^{i} \left[ \gamma_n \cdot \left( \frac{Q^*}{\omega} \right)^n \right] = \sum_{n=0}^{i} (\gamma_n \cdot \omega^{2-n} \cdot Q^{*n}) \quad (9)$$

T* indicates the torque command, $\omega$ indicates the motor speed, Q* indicates the target air flow, i indicates a finite value of integer which is equal to or larger than 0, and $\gamma_n$ indicates the blower coefficient (n=0, 1, 2, . . . , i) representing the blower characteristic which is unique to the blower.

In this case, when $\gamma_n$ in the formula (9) is defined as indicated by the following formula (10), the formula (9) is eventually the same as the formula (7).

$$\gamma_n = \alpha_n \cdot \left( \frac{1}{\beta} \right)^{2-n} \quad (10)$$

Therefore, in this case, also, the value of the blower coefficient $\gamma_n$ can be derived from the coefficient $K_n = \alpha_n$ in the formula (3) which is the regression formula of the measurement data and the motor speed $\omega_s = \beta$ in the measurement. In other words, in this case, also, the value of the blower coefficient which enables the constant air flow control, by performing the data measurement using one motor speed.

As described above, the motor control device and the control method thereof according to the present embodiment include a means which calculates the torque command as the product of the polynomial of variables derived by dividing the target air flow by the motor speed, and the square of the motor speed. In other words, in the motor control device and the control method thereof according to the present embodiment, the constant air flow control is performed by using the torque command derived uniquely from the target air flow. Therefore, the values of the blower coefficients which are applicable to every motor speed can be derived once the data measurement is performed using one motor speed. This makes it possible to implement the constant air flow control with a high accuracy and with fewer experiment steps.

Calculation Example 2 of Blower Coefficient

As described above, by obtaining the blower characteristic by the measurement experiment, the values of the blower coefficients $\alpha_n, \beta$ can be calculated. However, in some cases, a blower unit having a structure which is similar to that of the blower unit, the values of the coefficients $\alpha_n, \beta$ are preliminarily known, the values of the coefficients $\alpha_n, \beta$ can be derived without performing the above mentioned measurement experiment. The calculation example of the values of the coefficients $\alpha_n, \beta$ in this case will be now described.

Initially, a blower unit A, the values of the blower coefficients $\alpha_n, \beta$ are known and a blower unit B, the values of the blower coefficients $\alpha_n, \beta$ are unknown, are prepared. Then, the dimension ratio between the blower unit A and the blower unit B is calculated. In the present example, it is supposed that the outer diameter of a bladed wheel of the blower unit B is D times as large as that of the blower unit A. Then, the values of the blower coefficients $\alpha_n, \beta$ are found using the relation between the dimension ratio and the motor torque, and the relation between the dimension ratio and the air flow.

In general, in the case of the blower units which are equal in rotational speed, the motor torque for driving the blower unit is proportional to the fifth power of the outer diameter of the bladed wheel, and the air flow is proportional to the cubic of the outer diameter of the bladed wheel. Therefore, the following formulas (11) and (12) are satisfied:

$$\frac{T_B}{T_A} = D^5 \quad (11)$$

$$\frac{Q_B}{Q_A} = D^3 \quad (12)$$

In these formulas, $T_A$ indicates the motor torque for driving the blower unit A, $T_B$ indicates the motor torque for driving the blower unit B, $Q_A$ indicates the air flow of the blower unit A, $Q_B$ indicates the air flow of the blower unit B, and D indicates the dimension ratio of the outer diameter of the bladed wheel.

The calculation formula of the torque command of the blower unit A is represented by the formula (13):

$$T_A^* = \sum_{n=0}^{i} \left[ \alpha_{An} \cdot \left(\frac{\omega}{\beta}\right)^{2-n} \cdot Q_A^{*n} \right] \quad (13)$$

In this formula, $T_A^*$ indicates the torque command, $\omega$ indicates the motor speed, $Q_A^*$ indicates the target air flow, and $\alpha_{An}$ (n=0, 1, 2, . . . , i) and $\beta$ indicate constants.

By applying the formula (11) and the formula (12) to the above formula (13), the torque command $T_B^*$ of the blower unit B can be represented by the formula (14):

$$T_B^* = \sum_{n=0}^{i} \left[ \alpha_{Bn} \cdot \left(\frac{\omega}{\beta}\right)^{2-n} \cdot Q_B^{*n} \right]; \alpha_{Bn} = (D^{5-3n} \cdot \alpha_{An}) \quad (14)$$

In this formula, $T_B^*$ indicates the torque command, $\omega$ indicates the motor speed, $Q_B^*$ indicates the target air flow, $\alpha_{Bn}$ (n=0, 1, 2, . . . , i) and $\beta$ indicate constants, and D indicates the dimension ratio of the outer diameter of the bladed wheel.

Therefore, by multiplying the known blower coefficient $\alpha_{An}$ by the (5-3n)-th power (n=0, 1, 2, . . . , i) of the dimension ratio D of the outer diameter of the bladed wheel, the unknown blower coefficient $\alpha_{Bn}$ can be decided. Table 3 illustrated below shows the blower coefficient values of the blower unit B which has the same structure as that of the blower unit A having the blower coefficient values of table 2, and has an outer diameter of bladed wheel which is 1.2 times as large as that of the blower unit A.

TABLE 3

Coefficient values of blower unit which has the same structure as that of blower unit having coefficient values of table 2, and has outer diameter of bladed wheel which is 1.2 times as large as that of blower unit having coefficient values of table 2.

$\alpha_{B2}$ = 9.50E−04
$\alpha_{B1}$ = 5.46E−02
$\alpha_{B0}$ = 2.94E+00
$\beta$ = 73.3 (rad/sec)

As described above, according to the present calculation example of the blower coefficient values, the blower coefficient values can be derived by using the dimension ratio between the blower unit having the known blower coefficient values and the blower unit having the same structure as that of the blower unit having the known blower coefficient values, for the blower unit having the same structure as that of the blower unit having the known blower coefficient values. Therefore, according to the present example, the blower coefficients can be calculated without performing the measurement experiment.

Modified Example of Embodiment

Next, the modified example of the above described embodiment will be described.

Figure 8:
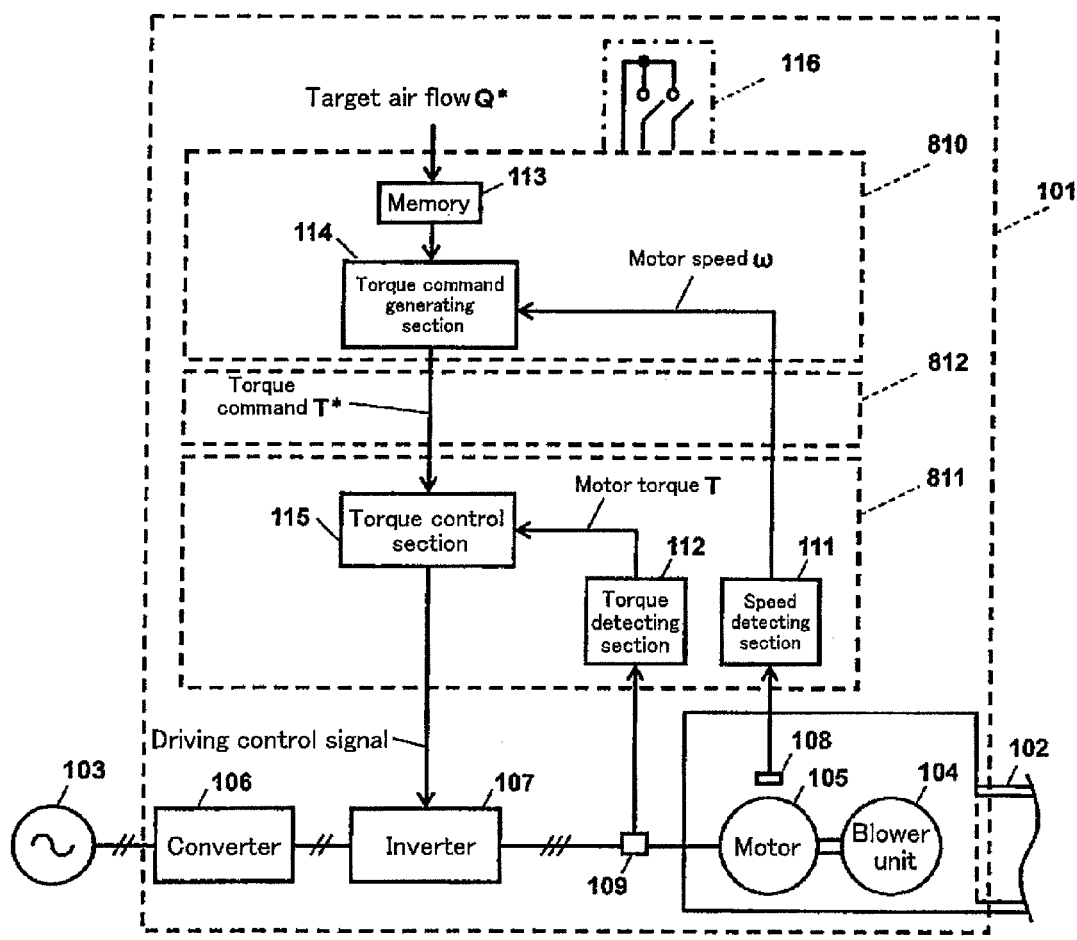
FIG. 8 is a block diagram showing a modified example of the motor control device according to the embodiment of the present invention.

FIG. 8 is a block diagram showing the modified example of the motor control device according to the embodiment of the present invention. In the embodiment of FIG. 1, the torque control section 115, the speed detecting section 111, and the torque detecting section 112 are provided within the motor control device 110 as in the torque command generating section 114. In contrast, in the present modified example, the motor control device includes the configuration of FIG. 8 instead of the configuration of FIG. 1.

Specifically, the motor control device according to the present modified example includes a first unit 810 including at least the torque command generating section 114, a second unit 811 including at least the torque control section 115, the speed detecting section 111 and the torque detecting section 112, and a communication section 812 which performs the data communication between the first unit 810 and the second unit 811.

As shown in FIG. 8, the first unit 810 and the second unit 811 are allowed to mutually communicate data via the communication section 812 including, for example, a communication cable of RS232C standard, etc. The motor speed $\omega$ detected by the speed detecting section 111 of the second unit 811 and the motor torque T detected by torque detecting section 112 of the second unit 811 are sent to the first unit 810 via the communication section 812. The first unit 810 calculates the torque command T* by using these data, and sends the torque command T* to the torque control section 115 of the second unit 811 via the communication section 812. The torque control section 115 outputs a driving control signal to the inverter 107 in response to the received torque command T* and thus controls the torque of the motor 105.

In the above described configuration of the modified example of FIG. 8, the advantages similar to those of the above described embodiment can be achieved.

Although an example in which the blower apparatus including the motor control device of the present invention is applied to general home has been described above, it may be applied to, for example, constructions for business purposes or commercial uses, such as buildings, air conditioning equipment for business purpose such as a clean room, and mobile objects such as cars, buses, railway vehicles, aircraft, marine vessels, etc.

Numeral improvements and alternative embodiments of the present invention will be conceived by those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is effectively applied to a motor control device which performs constant air flow control, irrespective of a change in a pressure loss condition or a change in a static pressure, and is useful as air conditioning equipment of general homes, constructions for business purposes, constructions for commercial uses, vehicle, etc.

What is claimed is:

1. A motor control device which controls a motor for driving a blower unit, comprising:

a torque command generating section which obtains a motor speed of the motor and generates a torque command which causes an air flow of air supplied from the blower unit to coincide with a target air flow;

wherein the torque command generating section is configured to calculate the torque command as a product of a polynomial of variables derived by dividing the target air flow by the motor speed, and a square of the motor speed.

2. The motor control device according to claim 1, wherein the torque command generating section calculates the torque command according to a formula:

$$T^* = \sum_{n=0}^{i} \left[ \alpha_n \cdot \left(\frac{\omega}{\beta}\right)^{2-n} \cdot Q^{*n} \right]$$

where $T^*$ indicates the torque command, $\omega$ indicates the motor speed, $Q^*$ indicates the target air flow, i indicates a finite value of integer which is equal to or larger than 0, and $\alpha_n$(n=0, 1, 2, ..., i) and $\beta$ indicate constants, respectively.

3. A method of controlling a motor for driving a blower unit, the method comprising:

a first step of obtaining a motor speed of the motor and generating a torque command which causes an air flow of air supplied from the blower unit to coincide with a target air flow;

wherein in the first step, the torque command is calculated as a product of a polynomial of variables derived by dividing the target air flow by the motor speed, and a square of the motor speed.

4. The method of controlling the motor according to claim 3, wherein in the first step, the torque command is calculated according to a formula:

$$T^* = \sum_{n=0}^{i} \left[ \alpha_n \cdot \left(\frac{\omega}{\beta}\right)^{2-n} \cdot Q^{*n} \right]$$

where $T^*$ indicates the torque command, $\omega$ indicates the motor speed, $Q^*$ indicates the target air flow, i indicates a finite value of integer which is equal to or larger than 0, and $\alpha_n$(n=0, 1, 2, ..., i) and $\beta$ indicate constants, respectively.

5. The method of controlling the motor according to claim 4, comprising:

measuring the motor torque of the motor and the air flow while driving the blower unit at one motor speed by the motor;

deriving a coefficient of the polynomial by regressing or approximating the motor torque to the polynomial relating to the air flow;

calculating a value of a constant $\alpha_n$ such that the coefficient of the polynomial becomes a factor of the constant $\alpha_n$; and deciding the one motor speed used in measurement of the motor torque and the air flow as a value of the constant $\beta$.

6. The method of controlling the motor according to claim 5, wherein the coefficient of the polynomial obtained by regressing or approximating the motor torque to the polynomial relating to the air flow is decided as the value of the constant $\alpha_n$.

7. The method of controlling the motor according to claim 5, wherein a value obtained by multiplying by an integer power of a change rate of a dimension of the blower unit, the coefficient of the polynomial obtained by regressing or approximating the motor torque to the polynomial relating to the air flow is decided as the value of the constant $\alpha_n$.

8. A blower apparatus including a blower unit; a motor which drives the blower unit; and a motor control device which controls driving of the motor, the motor control device comprising:

a torque command generating section which obtains a motor speed of the motor and generates based on the target air flow and the motor speed, a torque command which causes an air flow of air supplied from the blower unit to coincide with a target air flow; and a torque control section which obtains the motor torque of the motor and generates a signal for controlling a driving voltage supplied to the motor to cause the motor torque to coincide with the torque command;

wherein the torque command generating section calculates the torque command as a product of a polynomial of variables derived by dividing the target air flow by the motor speed, and a square of the motor speed.

* * * * *